BINDER STRAP TOOL

Original Filed March 8, 1962 2 Sheets-Sheet 1

Jack E. Caveney INVENTORS and
BY Roy A. Moody
William P. Porcelli
Atty

BINDER STRAP TOOL
Original Filed March 8, 1962 2 Sheets-Sheet 2
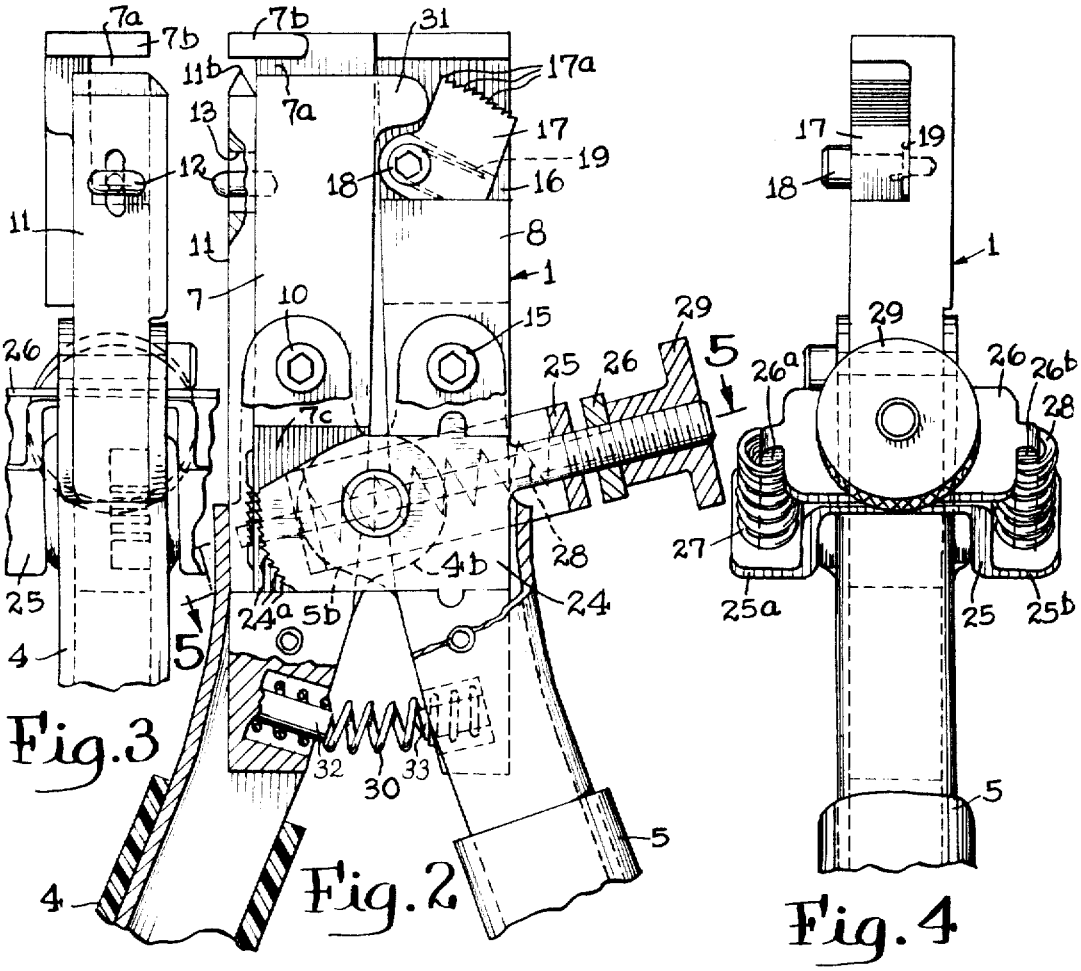
Fig. 3
Fig. 2
Fig. 4
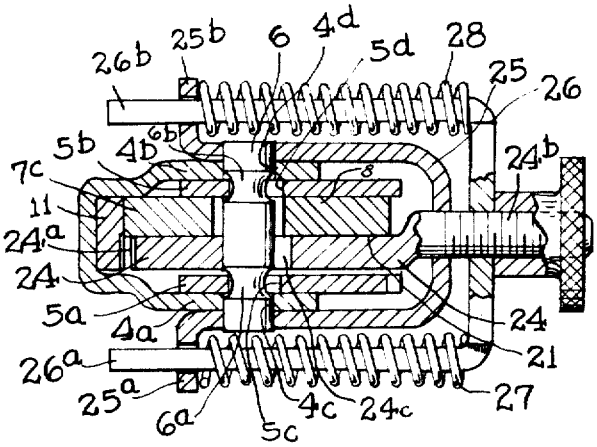
Fig. 5
INVENTORS
Jack E. Caveney and
BY Roy A. Moody
William P. Porcelli
Atty United States Patent Office Re. 26,492
Reissued Nov. 12, 1968

26,492
BINDER STRAP TOOL

Jack E. Caveney, Chicago, and Roy A. Moody, Flossmoor, Ill., assignors to Panduit Corporation, Tinley Park, Ill., a corporation of Illinois Original No. 3,169,560, dated Feb. 16, 1965, Ser. No. 178,332, Mar. 8, 1962. Application for reissue Feb. 6, 1967, Ser. No. 620,553
17 Claims. (Cl. 140—93.2)

Matter enclosed in heavy brackets [ ] appears in the original patent but forms no part of this reissue specification; matter printed in italics indicates the additions made by reissue.

*ABSTRACT OF THE DISCLOSURE*

*A hand tool is provided for tensioning a stretchable plastic strap about a bundle, the tool including two jaw members to which are attached handles and mounted to provide relative movement therebetween, the first jaw member restraining movement of one end of the strap and the second jaw member pulling on the other end of the strap so that movement of the jaw members away from each other causes the strap to be longitudinally tensioned therebetween and around the associated bundle, and a shear blade mounted adjacent the first jaw member for relative movement therebetween to sever the portion of the strap disposed between the restrained end of the strap and the second jaw member, an actuator for the shear blade for producing strap-severing relative movement between the shear blade and the jaw member, and bias means permitting actuation of the actuator only when a predetermined tension is reached in the strap to sever the portion of the strap disposed between the restrained end of the strap and the second jaw member while the strap is under the predetermined tension about the associated bundle, the bias means being adjustable to vary the amount of tension required to be reached in the strap before the shear blade is actuated.*

This invention relates to the art of binder strap applying tools and particularly to an improved tool for tensioning and securing a flexible binder strap around a bundle of wires, or the like.

When wiring complicated electrical and electronic installations as on electric control panels, automobiles, aircraft and others where a plurality of electrical components are wired together in different ways, it is customary to direct adjacent wires along close parallel paths for neatness and for facility of visual location by binding them together with string, straps, tape or other forms of wiring binders. These are adjustable binders which can accommodate a wide range of bundle sizes and, although some are releasable for reuse, there is a type which is not intended for reuse, once attached. It is the principal object of this invention to provide an improved tool which is particularly adapted to tension and secure the non-reusable type of binder around a bundle of wires and thereafter immediately cut off any extending free length of strap end left over.

It is still another object of the invention to provide such a tool which automatically severs the free length of strap end when a pre-determined tension is reached in the binder strap portion encircling the bundle.

It is another object of the invention to provide such a tool which can be adjusted to pre-set the pre-determined tension to be reached before severing the free length of strap end and which is easily adjusted in a simple and quick manner.

Another object is to provide a tool of the type mentioned which insures that the tension in the strap is substantially uniformly the same from strap to strap regardless of the strength and lack of skill of the tool operator.

It is still another object to provide a tool which is relatively inexpensive to manufacture, and of simple yet durable construction.

It is still another object of the invention to provide such a tool which can be used with binder straps of different widths and thicknesses and hardness of material without alteration in the structure of the tool. This is primarily because of the adjustment for the cutoff at any pre-determined strap tension.

It is another object to provide such a tool having a tensioning gripper which is self energized to automatically grip a strap when tensioning is to be started and which is automatically caused to be released from the strap after tensioning and cutoff is completed.

Other objects and advantages of the invention can be better understood by referring to the drawings in which FIG. 1 shows a perspective view of the hand of a worker tensioning a binder strap onto a bundle of wires by means of a tool embodying the features of this invention;

FIG. 2 shows a partially cutaway and partial sectional view of the operating end portions of the tool shown in FIG. 1;

FIG. 3 shows a left side view of the tool portion shown in FIG. 2;

FIG. 4 shows a right side view of the tool portion shown in FIG. 2;

FIG. 5 shows a sectional view as viewed along the line 5—5 of FIG. 2;

Figure 6:
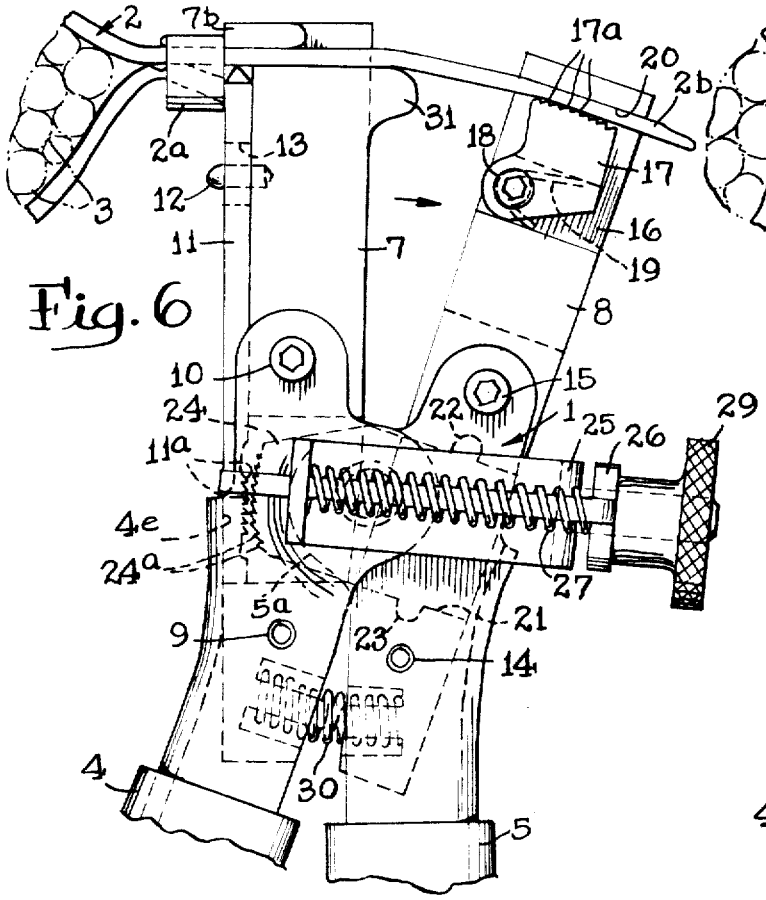
Figure 7:
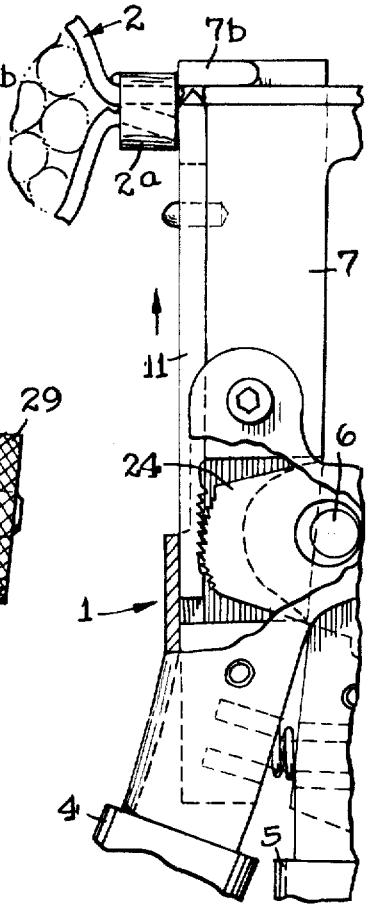

FIG. 6 shows a full view of the same portions of the tool shown in FIG. 2 except with a binder strap in position in the tool and the parts moved to an advanced relative position during strap tensioning; and FIG. 7 shows a right portion of the tool portion shown in FIG. 6 except in partial cutaway end section and in still more advanced relative position of the tool parts as the tool appears as the free strap end is severed.

Figure 1:
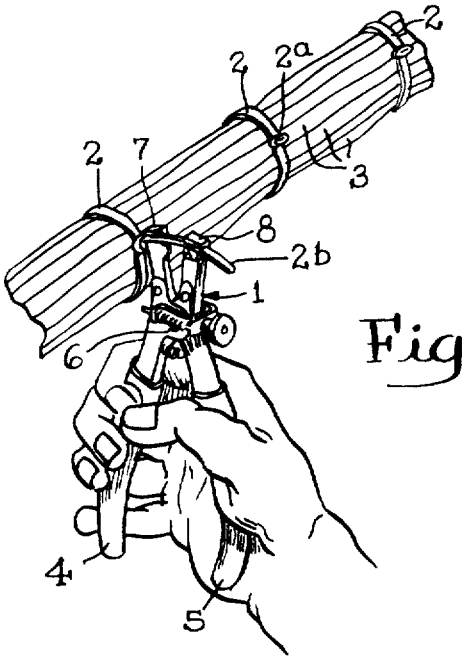

As shown in FIG. 1, a preferred embodiment of the tool 1 of this invention is used to tension and secure a binder strap 2 around a bundle of closely positioned parallel extending wires 3. The binder straps can be of different constructions, but the type indicated consists of a single length of strap having an enlarged wedge shaped end and surrounded by a sleeve 2a through which the free end of the strap is passed after it is encircled about the bundle into a loop. As the free strap end is drawn taut through the sleeve 2a, the strap tension urges the enlarged wedge shaped strap end into tighter engagement with the sleeve. Teeth can be provided on both the strap end and the enlarged end which mate with each other in order to check or retain the tension once reached. A binder strap of the type mentioned is shown in our copending application entitled Binder Strap, Serial No. 178,331, filed March 8, 1962 and *now Patent No. 3,197,829.*

The tool 1 consists essentially of two lower handles 4 and 5 pivoted together by means of a pin 6. Attached to the upper ends of the handles are two jaw members 7 and 8 which carry the mechanism for causing the strap to be tensioned and cut off.

In more detail, referring to FIGS. 2 to 7, the lower handles are channel shaped in cross-section and covered with tight fitting plastic or rubber covers for purposes of comfort and appearance. The handle 4 is provided with two parallel and spaced apart ears 4a and 4b which overlap corresponding shaped ears 5a and 5b projecting from the handle 5. The ears 4a and 4b are offset laterally by the thickness of the ears 5a and 5b in order to allow the said overlap. The pivot pin 6 extends through aligned holes 4c, 5c, 5d, 4d in the ears 4a, 5a, 5b, 4b, respectively, in order to pivot the handles 4 and 5, together. The pin 6 is provided with two annular recesses 6a and 6b which permit movement of the ears 5a and 5b relative to the pin 6 and create an eccentricity between the holes 5c and 5d and the pin 6.

The handle 4 has secured in a fixed position within its channel portion between its two parallel walls the jaw member 7 which is secured in place by means of a drive pin 9 and a screw 10, both of which extend through both walls of the handle 4 and the jaw member 7. The jaw member 7 is narrowed to accommodate a shear blade 11 which is held in a slidable position along the member 7 by means of a T-shaped stud 12 extending through a slot 13 provided in the shear blade 11. The shear blade 11 is also positioned between the wall 4e of the handle 4 and the member 7 to prevent pivotal movement of the shear blade 11 on the stud 12. The lower portion of the shear blade 11 is provided with sharp sawtooth shaped teeth 11a, which face in the direction toward the other handle 5. The upper end of the jaw member 7 is provided with a passage 7a formed between the lower wall of a projection 7b and another wall on the jaw member 7. The projection 7b extends beyond the main body of the jaw member 7 where it is in alignment with the cutting edge 11b of the shear blade 11 where it can act as a reaction surface for the shear blade 11.

The handle 5 has secured in a fixed position within its channel portion between its two parallel walls the jaw member 8 which is secured in place by means of a drive pin 14 and a screw 15, both of which extend through both walls of the handle 5 and the jaw member 8. The jaw member 8 is provided with a rectangular recess 16 which accommodates a strap gripper 17 pivoted to the jaw member 8 by means of a screw 18. The strap gripper 17 is recessed on its hidden side to accommodate a spring 19 which reacts between the gripper 17 and the jaw member 8 to urge the gripper 17 counterclockwise, as viewed in FIGS. 2 and 6, toward the wall 20 of the recess 16. The gripper 17 is provided with sharp sawtooth shaped teeth 17a along its upper surface.

Keyed within a transverse recess 21 of the jaw 8, by means of projections 22 and 23, is a shear blade actuator 24 which is provided at its free end with sharp sawtooth shaped teeth 24a positioned adjacent to the region of the teeth 11a on the shear blade 11 and directed to mesh with the teeth 11a when engaged with them, as later described. This shear blade actuator 24 is provided with a hole 24c somewhat larger than the diameter of the pin 6 which also passes through it. Alongside the free end of the actuator 24 is a thinner portion 7c of the jaw member 7 which provides a recess for freely receiving the toothed or free end portion of the actuator 24. The opposite end 24b of the shear actuator 24 is threaded and projects through holes in two yokes 25 and 26. The yokes are provided as carriers for two outboard mounted springs 27 and 28. The yoke 25 is pivoted onto the outer ends of the pin 6 and provided with two laterally directed flanges 25a and 25b. The yoke 26 has two arms 26a and 26b which carry the springs 27 and 28 around them and extend freely through openings in the flanges 25a and 25b. In this manner, the springs 27 and 28 are held captive. The threaded end 24b is engaged with a thumb nut 29 and adjustment of the nut along the threaded end 24b adjusts the compression of the spring 27 and 28. Movement of the nut 29 onto the threaded portion 24b causes the springs 27 and 28 to be compressed. The force of the springs urges the shear blade actuator 24 away from the shear blade 11 in order to keep the teeth 24a disengaged from the teeth 11a. The holes 5c, 24c and 5d of a diameter larger than that of the pin 6 allow this separated condition of the teeth, and the condition is clearly shown in FIG. 5. At a time when the compressive force of the springs 27 and 28 is overcome, the shear blade actuator 24 is free to be moved toward the shear blade 11 so that the teeth 24a can engage the teeth 11a. The engaged condition of the teeth is shown in FIG. 7.

In order to cause return of the handles 4 and 5 and the jaw members 7 and 8 from their positions shown in FIG. 6 to those shown in FIG. 2, a compression spring 30 may be mounted between recesses in the jaw members 7 and 8.

In operation, the parts of the tool 1 are allowed to move to their positions as shown in FIGS. 2, 3, 4 and 5 by force of the compression spring 30. Then, the free end 2b of a binder strap 2 is inserted through the passage 7a of the jaw member 7 after being encircled around a bundle of wires 3 and through the connector sleeve 2a. The free end 2b is extended through the recess 16 in the jaw member 8 and past the teeth 17a of the strap gripper 17 which is then held rotated clockwise by means of a projection 31 on the jaw member 7. The handles 4 and 5 are moved toward each other and, as they are, the projection 31 is separated from the strap gripper 17 to allow the teeth 17a of the strap gripper 17 to grip the strap end 2b as the gripper is allowed to rotate against it. As the handles 4 and 5 continue to be moved toward each other, the gripper 17 causes the strap end 2b to be pulled and thereby tensioned around the bundle of wires 3.

As soon as a certain tension is reached corresponding to the force of compression existing in the springs 27 and 28 determined by the setting of the thumb nut 29 on the threaded portion 24b of the shear blade actuator 24, the actuator 24 is caused to be moved toward the shear blade 11 upon continued movement of the handles 4 and 5 toward each other. When the teeth 24a engage the teeth 11a, continued movement of the handles 4 and 5 causes the actuator 24 to elevate the shear blade 11 from its position shown in FIG. 6 to that as shown in FIG. 7. This action occurs because the actuator 24 pivots integrally with the handle 5 since it is rigidly attached to it. As the shear blade 11 reaches its final movement, its cutting edge 11b severs through the strap end 2b to sever it from the remainder of the binder strap 2 adjacent to the sleeve 2a. During the actual severing of the strap, the inherent resilience of the tensioned strap portion 2b between the jaws 7 and 8, and the yielding of the tensioned strap at the place where the cutting edge 11b of the blade engages and penetrates the strap, permits that final increment of motion of the handle 5 and the actuator 24 with respect to the handle 4 necessary to cause the final movement of the shear blade 11 prior to the parting of the strap. In this connection it may be noted that, because the strap is tensioned between the jaws 7 and 8 during the severing action, the strap will actually part before the blade 11 has passed entirely through the strap.

The stroke of the handles 4 and 5 is limited by two stops 32 and 33 which are surrounded by the ends of the spring 30. In case one full stroke or less does not cause enough tension to be reached in the binder strap 2 to cause shearing, the handles can be released and a new stroke taken.

Upon completion of the shearing of the strap end 2b, the cutoff end is removed from the tool and, the handles are again allowed to separate and the jaw members 7 and 8 are brought together by force of the spring 30. As they go together, the projection 31 again causes the strap gripper 17 to pivot clockwise to clear the upper portion of the recess 16 for the reception of another strap end 2b during the next strapping cycle.

To further understand the movement of the shear blade actuator 24 toward the shear blade 11, an explanation of the forces involved should be helpful. The forces tending to overcome the compressive forces of the springs 27 and 28 are the tensional force developed in the strap positioned between the two jaw members 7 and 8 plus the force manually applied to the handles 4 and 5. It is when the sum of the tensioned force developed in the strap plus the force applied to the handles exceeds the compressive forces of the springs that the actuator is moved toward the shear blade 11 to actuate it.

It has been previously described that the holes 5c, 25 and 5d are of a diameter larger than that of the pin 6 to allow movement of the shear blade actuator 24 toward the shear blade 11. Annular recesses 6a and 6b are provided in the pivot pin 6 for aiding in this movement. Other constructions are possible for the same purpose. The pin 6 can be made smooth without annular recesses 6a and 6b provided holes 5c and 5d are made of large diameter, or the holes 5c and 5d can be made as oval or elongated slots with a width equal to the pivot pin diameter.

Since the return spring 30 reacts in the same direction as the springs 27 and 28, it should be as weak as possible so that its force does not dominate to determine the time of actuation of the shear blade 11. In fact, it can be entirely eliminated without impairing the functioning of the tool other than by requiring the handles 4 and 5 to be manually returned.

Although only a single embodiment of the invention has been shown and described, it should be clearly understood that the invention can be made in other different ways without departing from the true scope of the invention as defined by the appended claims.

We claim:

1. A *hand* tool for tensioning a strap, comprising two jaw members [joined together] *mounted* to provide relative movement between them, the first jaw member having means to restrain *longitudinal* movement of one end of [said] *the* strap, the second jaw member having means for [gripping] *pulling on* the other end of [said] *the* strap, the relative movement in one direction between the jaw members causing the strap to be *longitudinally* tensioned *therebetween,* [a shear blade] *strap severing means* mounted [for movement] adjacent said first jaw member *for strap-severing relative movement therebetween to sever the portion of the strap disposed between the restrained end of the strap and said second jaw member,* [an actuator for said shear blade] *actuating means for producing said strap-severing relative movement between said strap severing means and said first jaw member,* and bias means [to prevent said actuator from actuating said shear blade until] *permitting activation of said actuating means only when* a [pre-determined] *predetermined* tension is reached in [said] *the* strap *to sever the portion of the strap disposed between the restrained end of the strap and said second jaw member while the strap is under tension.*

2. A tool defined by claim 1 characterized by, said bias means being adjustable to vary the amount of [predetermined] *predetermined* tension required to be reached in [said] *the* strap before said [shear blade] *strap severing means* is actuated.

3. A manually portable hand tool for tensioning a strap comprising, two jaw members [joined together] *mounted* to permit relative movement between them, the first jaw member having means to restrain *longitudinal* movement of one end of [said] *the* strap, the second jaw member having means for [gripping] *pulling on* the other end of [said] *the* strap, jaw operating means for applying force to said jaw members to provide relative movement therebetween to cause said strap to be *longitudinally* tensioned *therebetween,* [a shear blade] *strap severing means* mounted [for movement] adjacent said first jaw member *for strap-severing relative movement therebetween to sever the portion of the strap disposed between said restrained strap end and said second jaw member,* actuating means for [said shear blade] *producing said strap-severing relative movement between said strap severing means and said first jaw member,* [said actuating means being movable by said jaw operating means for actuating said shear blade,] and bias means [restraining] *for permitting* movement of said actuating means [to prevent said actuating means from actuating said shear blade until] *to produce said strap-severing relative movement between said strap severing means and said first jaw member only when* a predetermined tension is reached in [said] *the* strap *to sever the portion of the strap disposed between said restrained strap end and said second jaw member while the strap is under tension,* said bias means being overcome when the effect thereon of the predetermined tension in the strap and of the force required to be applied [to] *by* said jaw operating means to produce said predetermined tension [,] exceeds the force of said bias means.

4. A binder strap tool comprising two jaw members pivotally secured together to provide relative angular movement between them, the first said jaw having means against which the connector end of binder strap loop encircled about an object can be held, the second said jaw member having thereon a strap gripper for gripping the free end of said binder strap loop extending from said connector end, the relative angular movement between the jaw members causing the free end to be pulled away from said connector end to cause said strap loop to shrink in size and be tensioned onto said object, a shear blade mounted for movement along said first jaw member, an actuator for said shear blade, and bias means to prevent said actuator from actuating said shear blade until a predetermined tension is reached in said binder strap loop.

5. A tool for tensioning a strap comprising, two jaw members pivotally joined together to provide relative pivotal movement between them, the first jaw member having means to restrain movement of one end of said strap, the second jaw member having means for gripping the other end of said strap, the relative pivotal movement in one direction between the jaw members causing the strap to be tensioned, a shear blade mounted for movement adjacent said first jaw member, an actuator for said shear blade mounted on said second jaw member to pivot with it, bias means between the first jaw member and the actuator to urge the actuator away from the shear blade, the actuator engaging the shear blade when the bias means is overcome to allow the shear blade to be moved by the actuator as said second jaw member is continued to be pivotally moved in said one direction causing the strap to be tensioned.

6. A tool defined by claim 5 characterized by, said shear blade and said actuator having teeth which engage each other as the actuator is caused to engage the shear blade, said teeth causing the movement of said shear blade upon movement of said actuator.

7. A tool for tensioning a strap comprising, two frames pivotally joined together at a pivot to provide relative pivotal movement between them, the upper end of the first frame having means to restrain movement of one end of said strap, the upper end of the second frame having means for gripping the other end of said strap, the relative pivotal movement of the two frames in one direction causing the strap to be tensioned, the lower ends of the frames below said pivot having handles which when moved toward each other cause said pivotal movement tensioning the strap, a shear blade mounted for movement toward the path of said strap positioned between the upper ends of said two frames, an actuator for said shear blade mounted to pivot with said second frame, bias means between the shear blade and the actuator urging the actuator away from said shear blade, the actuator engaging the shear blade when the bias means is overcome to allow the shear blade to be moved by the actuator, said bias means being overcome by continuing to move the handles together when the maximum force of said bias means is equal to the tension in the strap plus the force applied to the handles so that the shear blade is moved by the actuator when the maximum force of said bias means is overcome.

8. A tool defined by claim 7 characterized by, said bias means being adjustable to vary the maximum force of said bias means to thereby cause the shear blade to be actuated corresponding to different tensions reached in the strap.

9. A tool defined by claim 7 characterized by, said shear blade and said actuator having teeth which engage each other as the actuator is engaged with the shear blade, said teeth causing the movement of said shear blade upon movement of said actuator.

10. A tool defined by claim 7 characterized by, said pivot between the two frames being loose enough to allow free movement between the handles in the region of the pivot in order to allow said movement of the actuator toward said shear blade.

11. A tool for tensioning a strap comprising, two frames pivotally joined together on a pivot pin to provide relative pivotal movement between them, the upper end of the first frame having means to restrain movement of one end of the strap and hold it stationary, the upper end of the second frame having means for gripping the other end of said strap, the relative pivotal movement of the two frames away from each other causing the strap to be tensioned, the lower ends of the frames below said pivot pin having handles which when moved toward each other cause said pivotal movement of the two frames away from each other to tension the strap, a shear blade with a cutting edge mounted for movement along the upper end of said first frame between a retracted position and an extended position where its cutting edge is adapted to sever the strap extending between the upper ends of the frames, an actuator for said shear blade secured to said second frame in such a way that the actuator pivots and moves with said actuator, spring bias means mounted to exert a force tending to urge the actuator away from said shear blade, the fit of said pivot pin in the region of where the two frames are pivotally joined having clearance enough to allow the frames to move bodily relative to each other by an amount sufficient to permit the actuator to be moved with the second frame into contact with the shear blade, the force of said spring bias means being overcome upon continued movement of the handles toward each other when the tension reached in the strap plus the force applied between the handles exceeds the force of said spring bias means to thereby allow the actuator to contact the shear blade and extend the shear blade upon continued movement of the handles toward each other to sever the tensioned strap.

12. A tool defined by claim 11 characterized by, said spring bias means being provided with adjustable means for varying its force tending to urge the actuator away from the shear blade in order to vary the strap tension required to be reached before the tensioned strap is severed by the shear blade.

13. A tool defined by claim 11 characterized by, said spring means including a compression spring reaching between a first member on the second frame and a second member on said pivot pin, said actuator having a threaded shaft extending through said first member and provided with a threaded nut which can be threadably moved along the threaded shaft in order to vary the compression of said spring and thereby vary the force of said spring means tending to urge the actuator away from the shear blade in order to vary the strap tension required to be reached before the tensioned strap is severed by the shear blade.

*14. A binder strap tool for tightening a binder strap loop about a bundle by pulling a free strap end with respect to a connector strap end and for cutting the free strap end extending outwardly from the connector strap end, said tool comprising a first jaw member having a strap engaging member thereon for engaging an associated connector strap end during the tightening of the loop about the bundle, a second jaw member having a strap pulling member thereon for pulling on the free strap end during the tightening of the loop about the bundle, drive structure interconnecting said jaw members for moving said jaw members away from each other to pull the free strap end away from the connector strap end to tighten the loop about the bundle and to place under tension the strap including the portion disposed between said engaged connector strap end and said second jaw member, strap severing means positioned to sever the portion of the free strap end between said engaged connector strap end and said second jaw member, and an actuator for said strap severing means responsive to the placement of the strap under a predetermined tension for actuating said strap severing means to sever the free strap end between said engaged connector strap end and said second jaw member.*

*15. A binder strap tool for tightening a binder strap about a bundle, wherein the binder strap has a connector at one end thereof and a portion forming a loop about the bundle and a free end extending through the connector and movable with respect thereto when under tension only in a strap tensioning direction, said tool comprising a first jaw member having a connector engaging member thereon for engaging the connector during the tightening of the loop about the bundle, a second jaw member having a strap pulling member thereon for pulling on the free strap end during the tightening of the loop about the bundle, drive structure interconnecting said jaw members for moving said jaw members away from each other to pull the free strap end in the strap tightening direction away from the connector to tighten the loop about the bundle and to place under tension the strap including the portion disposed between said jaw members, strap severing means positioned adjacent to said first jaw member for strap-severing relative movement therebetween to sever the portion of the strap disposed between the connector and said second jaw member, and an actuator for said strap severing means responsive to the placement of the strap under a predetermined tension for actuating said strap severing means to sever the free strap end at a point disposed between the connector and said second jaw member while the strap in the loop is under the predetermined tension, the connector gripping the associated portion of the strap to hold the strap in the loop about the bundle under the predetermined tension.*

*16. A binder strap tool for tightening a binder strap about a bundle, wherein the binder strap has a connector at one end thereof and a portion forming a loop about the bundle and a free end extending through the connector and movable with respect thereto when under tension only in a strap tensioning direction, said tool comprising a first jaw member having a connector engaging member thereon for engaging the connector during the tightening of the loop about the bundle, a second jaw member having a strap pulling member thereon for pulling on the free strap end during the tightening of the loop about the bundle, drive structure interconnecting said jaw members for moving said jaw members away from each other to pull the free strap end in the strap tightening direction away from the connector to tighten the loop about the bundle and to place under tension the strap including the portion disposed between said jaw members, strap severing means positioned adjacent to said first jaw member for strap-severing relative movement therebetween to sever the portion of the strap disposed between the connector and said second jaw member, actuating means for producing said strap severing relative movement between said strap severing means and said first jaw member, and bias means for permitting movement of said actuating means to produce said strap severing relative movement between said strap severing means and said first jaw member only when a predetermined tension is reached in the strap to sever the free strap end at a point disposed between the connector and said second jaw member while the strap in the loop is under the predetermined tension and the portion disposed between said jaw members is under tension, the connector gripping the associated portion of the strap to hold the strap in the loop about the bundle under a predetermined tension.*

*17. A binder strap tool for tightening a binder strap about a bundle, wherein the binder strap has a connector at one end thereof and a portion forming a loop about the bundle and a free end extending through the connector and movable with respect thereto when under tension only in a strap tensioning direction, said tool comprising a first jaw member having a connector engaging member thereon for engaging the connector during the tightening of the loop about the bundle, a second jaw member having a strap pulling member thereon for pulling on the free strap end during the tightening of the loop about the bundle, first drive structure interconnecting said jaw members for moving said jaw members away from each other to pull the free strap end in the strap tightening direction away from the connector to tighten the loop about the bundle and to place under tension the strap including the portion disposed between said jaw members, strap severing means positioned adjacent to said first jaw member for strap-severing relative movement therebetween to sever the portion of the strap disposed between the connector and said second jaw member, second drive structure for moving said strap severing means relative to said first jaw member, and an actuator operatively connectable both to said first drive structure and said second drive structure, said actuator being initially connected to said first drive structure for causing said first drive structure to move said jaw members away from each other to place the strap under a predetermined tension, and bias means responsive to the placement of the strap under a predetermined tension for permitting interconnection of said actuator and said second drive structure to produce said strap-severing relative movement to sever the free strap end at a point disposed between the connector and said second jaw member while the strap in the loop is under the predetermined tension and the portion disposed between said jaw members is under tension, the connector gripping the associated portion of the strap to hold the strap in the loop about the bundle under a predetermined tension.*

References Cited

The following references, cited by the Examiner, are of record in the patented file of this patent or the original patent.

UNITED STATES PATENTS

| | | | |
|---|---|---|---|
| 1,989,669 | 2/1935 | Harvey | 140—123.6 |
| 1,463,869 | 8/1923 | Campbell. | |
| 1,499,096 | 6/1924 | Campbell. | |
| 2,569,623 | 10/1951 | Wognum. | |
| 2,967,550 | 1/1961 | Rosenberger. | |

CHARLES W. LANHAM, *Primary Examiner.*

LOWELL A. LARSON, *Assistant Examiner.*